United States Patent [19]
Vogel et al.

[11] Patent Number: 5,613,219
[45] Date of Patent: Mar. 18, 1997

[54] TRANSCEIVER HAVING PLURAL ANTENNAS AND ADJUSTING THE TIME DELAY OF TRANSMITTED SIGNALS TO MATCH THE TIME DELAY OF RECEIVED SIGNALS

[75] Inventors: Martin Vogel, Erlangen; Adrian van Kampen, Burgthann, both of Germany

[73] Assignee: U.S. Philips Corporation, New York, N.Y.

[21] Appl. No.: 567,863

[22] Filed: Dec. 6, 1995

Related U.S. Application Data

[63] Continuation of Ser. No. 190,959, Feb. 3, 1994, abandoned.

[30] Foreign Application Priority Data

Feb. 5, 1993 [DE] Germany .......................... 43 03 355.5

[51] Int. Cl.⁶ .................................................. H04B 1/40
[52] U.S. Cl. .............................. 455/78; 455/89; 455/101; 455/272; 342/368
[58] Field of Search ........................ 455/67.1, 67.6, 455/78, 82–83, 89, 101, 103, 272–273, 276.1, 278.1, 296, 303–304, 337; 375/229, 260, 299, 347, 348, 349; 370/24, 29, 32, 77; 342/368, 371

[56] References Cited

U.S. PATENT DOCUMENTS

| | | | |
|---|---|---|---|
| 2,629,819 | 2/1953 | Rabuteau | 455/101 |
| 3,693,088 | 9/1972 | Rustako, Jr. et al. | 455/52.3 |
| 4,736,455 | 4/1988 | Matsue et al. | 455/276.1 |
| 4,814,773 | 3/1989 | Wechsberg et al. | 342/371 |
| 5,077,759 | 12/1991 | Nakahara | 455/67.6 |
| 5,097,484 | 3/1992 | Akaiwa | 455/101 |
| 5,268,933 | 12/1993 | Averbuch | 455/101 |
| 5,274,844 | 12/1993 | Harrison et al. | 455/276.1 |
| 5,276,452 | 1/1994 | Schuss et al. | 342/371 |
| 5,339,086 | 8/1994 | DeLuca et al. | 342/371 |

FOREIGN PATENT DOCUMENTS

| | | | |
|---|---|---|---|
| 3713086 | 11/1988 | Germany | 455/101 |
| 185433 | 3/1989 | Japan | 455/101 |
| 173832 | 3/1989 | Japan | 455/101 |
| 1276831 | 11/1989 | Japan | 455/101 |
| 298224 | 4/1990 | Japan | 455/101 |
| 3101424 | 4/1991 | Japan | 455/103 |
| 2237706 | 5/1991 | United Kingdom . | |

OTHER PUBLICATIONS

Stapleton et al., Cellular Base Station Phased Array Antenna System, Communication Science Library School of Engineering Science, Simon Frasier University, 1993.

Caini et al., A Spectrum and Power Efficient EHF Mobile Satellite System to be Integrated with Terrestrial Cellular Systems, IEEE Journal on Selected Areas in Communications, vol. 10, No. 8. Oct. 1992.

*Primary Examiner*—Andrew Faile
*Attorney, Agent, or Firm*—Arthur G. Schaier

[57] ABSTRACT

A transceiver for use in a radio transmission system has a plurality of receiving antennas and a plurality of transmitting antennas. The time delays between received antenna signals produced by a radio signal transmitted from another transceiver in the system are detected. For transmission, the time delays between the transmitted antenna signals are adjusted to correspond to the detected time delays between the received antenna signals. By antenna sharing, each may actually serve for both transmission and reception. Since the delayed transmitted signals will arrive simultaneously at the other transceiver they will superpose on each other, thus achieving a significant improvement in received signal strength at such transceiver.

14 Claims, 2 Drawing Sheets

TRANSCEIVER HAVING PLURAL ANTENNAS AND ADJUSTING THE TIME DELAY OF TRANSMITTED SIGNALS TO MATCH THE TIME DELAY OF RECEIVED SIGNALS

This is a continuation of application Ser. No. 08/190,959, filed Feb. 3, 1994, abandoned.

BACKGROUND OF THE INVENTION

1. Field of the Invention

The invention relates to a radio system comprising at least one transceiver which transmits and receives via a plurality of antennas, and which for reception is a so-termed "space diversity" system wherein a signal is received via spatially separated antennas. Due to the spatial separation of the receiving antennas, the received signals traverse various paths and are subjected to various influences which attenuate or distort them. By a suitable combination of the received signals the receiving quality is improved.

2. Description of the Related Art

British Patent Specification GB 2,237,706 A has disclosed a transceiver device for which a plurality of antennas is provided for transmission or reception. To avoid signal attenuations or possibly signal losses caused by interference in this disclosed arrangement, a transmit signal is transmitted delayed in time by a plurality of antennas. For this purpose, the transmit branches comprise delay elements having a fixed delay. In this manner a decorrelation is obtained of the delayed antenna signals. At the receiver end the original signal is reconstructed from these signals by an equalizer.

SUMMARY OF THE INVENTION

It is an object of the invention to provide a radio system which achieves improved reception of a radio signal.

To achieve this object, in a radio system of the type defined in the opening paragraph, reception at a transceiver takes place via at least two antennas, which transceiver comprises detectors for detecting the time delays between the separately received antenna signals. The signals are transmitted via various antennas, adjusting means being provided for adjusting time delays of the transmitted signals so as to correspond to the detected time delays.

The detected time delays are caused, in essence, by the delay in reception of a radio signal at different receiving antennas. For example, the path from a subscriber at the other end of the radio link to a transceiver having different receiving antennas has different lengths. The differences of path length are caused by the spacing of the receiving antennas and also by reflection of the radio signal by obstacles in the radio path. Since the differences in path lengths depend on the locations of the various radio subscribers, the measured time delays carry information about the radio user's position. The time delays of the signals received at the various antennas are measured. On transmission, a radio signal is transmitted from an equal number of antennas with a delay in accordance with the measured time delays. In this manner the information obtained as to reception delay is taken into consideration on transmission.

A first possibility of generating time delayed transmit signals is the use of a single transmitter. In that case each transmission branch may comprise a delay element. A further possibility of generating the time delays is arranging a plurality of transmission branches whose transmit periods are shifted in time by a control device. In that case no delay elements are necessary.

In contrast to said British Patent Application, a correlation in lieu of a decorrelation of the transmit signals is pursued. At the location of the radio subscriber at the other end of the radio link the delayed signals arrive simultaneously and are superimposed on each other. Therefore, without any increase of the transmit power there is an increase of the received field strength at the location of the other radio subscriber. With such a radio system the effect of interference generally occurring in radio transmission can be reduced.

In principle, the invention can be applied both to radio systems transmitting digital signals and radio systems transmitting analog signals. In digital radio systems, however, a smaller received field strength than with analog systems is obtained with an equal transmit power, because digital systems require a larger bandwidth than analog systems. For this reason, a radio system according to the invention is extremely advantageous especially for digital systems.

A further embodiment of the invention is characterized in that the transmitting and receiving antennas are arranged in pairs which are formed by one transmitting and one receiving antenna.

As observed hereinbefore, there is a time delay between two received signals which is caused, in essence, by the path differences for a radio signal from one end to the other in the radio link, various spatially separated antennas for receiving the signal being arranged at the receiver end. In order that when subsequently a radio signal is transmitted via various antennas having the measured time delays the transmit signals will arrive simultaneously at the location of the other radio subscriber, thereby increasing the receiving field strength, the transmit signals should traverse substantially the same paths as the received signals whose time delays were measured. This condition can be satisfied in an extremely simple manner and for all possible locations of the other radio subscribers by arranging the transmitting and receiving antennas in pairs. With a spatial arrangement in pairs the distance between the paired transmitting and receiving antennas is small, so that for each pair of antennas the transmit and receive paths are substantially identical. With this arrangement it is possible to effect simultaneous transmission and reception. This is especially advantageous if the other radio subscriber is a mobile station moving fast relative to the transceiver device. Relative movements are especially annoying if the distance between the radio subscribers is only very small, for example, several hundred meters.

In another further embodiment of the invention a combined transmitting/receiving antenna is arranged in the transceiver device. This requires a decoupling of the transmit and receive paths. For example, duplex filters or change-over devices may be used as a decoupling means depending on the application. Compared with an arrangement having separate transmitting and receiving antennas, only half the number of antennas is necessary. Also, the problem described above of the transmit and receive paths not being fully identical when separate antennas are used for transmission and reception, does not occur here because transmitting and associated receiving antennas are identical and are therefore not spatially apart. A change-over device for alternately coupling the antenna to the transmit branch of the transceiver device on transmission or to the receive branch thereof on reception is especially advantageous for a radio system operated in the half duplex mode.

In a further embodiment of the invention the time delays of the received signals are derived from their quadrature components.

In principle, the time delays can be measured both on the basis of the modulated received signals in the high-frequency area and on the basis of the demodulated received signals in the low-frequency baseband area. Quadrature receivers offer an option to demodulate a high-frequency received signal into low-frequency quadrature components. The I (in-phase) and Q (quadrature) components of a received modulated signal are obtained if such signal is multiplied respectively by a cosine or sine signal having the modulation frequency, the signals so obtained then being subjected to low-pass filtering. These I and Q components completely describe the received signal in the low-frequency baseband.

A further advantageous embodiment of the transceiver device according to the invention is characterized, in that each receive branch comprises a quadrature receiver for demodulating the received signals and in that a device for synchronizing the quadrature receivers is available.

Each receive branch and also each quadrature receiver is supplied with an antenna signal. The quadrature receivers demodulate the received signals as has already been described hereinbefore. They produce the I and Q quadrature components. It has been found that in such an arrangement of the I and Q quadrature components there is an unambiguous time delay only if both quadrature receivers derive the measured time delay from a common time base. For this reason synchronization is provided by an oscillator coupled in common to all the quadrature receivers.

A further embodiment of the invention is characterized in that the time delays are detected and adjusted as phase differences.

The phase difference (difference between the phase angles) between two received signals can be calculated either from the I components or the Q components of the received signal. The measured time delays can be denoted phase differences, because the phase difference between two signals denotes their mutual shift in time or in space. The phase differences depend on the modulation frequency. It is especially advantageous for the phase differences of the high-frequency modulated received signals to be determined on the basis of the low-frequency quadrature components of the received signals. Phase shifters are included in the transmit branches as a means for adjusting the phase differences.

If the receiving antennas have a sufficiently small spacing (typically smaller than 1 m) and if the distance between the two radio subscribers is small (less than several hundred meters), the measured time delays will be small and correspond to phase differences not exceeding 360 degrees. In that case the phase difference is calculated unambiguously and the time delay of the received signals corresponds to the time delay of the transmitted signals. For time delays corresponding to phase differences that exceed 360 degrees, the quadrature components can no longer produce unambiguous results. In that case calculation of the phase difference results in a value between 0 and 360 degrees, although the real phase difference is really many times larger than 360 degrees. The phase difference of the transmitted signals is adjusted by the phase shifters always within a range from 0 to 360 degrees. The result is that the transmitted signals may arrive at the location of the other radio subscriber with a phase difference many times 360 degrees (relating to the high-frequency modulation frequency). If the resultant time delay of these signals is small as against the period of the low-frequency information carrying frequency portions, the constructive superpositioning of the transmitted signals at the location of the other radio subscriber is disturbed only slightly. With digital signals the period of the low-frequency frequency portions corresponds to the bit period. Therefore, it is advantageous with digital signals to have small time delays relative to the bit period. The time delay of a bit is then not to exceed the period of one bit because there then will be no constructive superpositioning.

A further embodiment of the invention is characterized in that the transceiver device is comprised in the base station of a mobile radio system. The base station comprises a transceiver having several antennas; whereas the mobile stations transmit and receive with only a single antenna. If the mobile stations are, for example, handsets, they have space limitations and so and normally only one antenna is built in. By using a radio system according to the invention it is possible to concentrate the arrangement for achieving better reception in the base station, where there is generally no lack of space. Although the mobile stations are arranged for reception with only one antenna, the advantage of the described diversity technique is also made use of in the mobile station.

BRIEF DESCRIPTION OF THE DRAWINGS

Embodiments of the invention will be further explained with reference to the following drawing Figures, in which.

DESCRIPTION OF THE PREFERRED EMBODIMENTS

Figure 1:
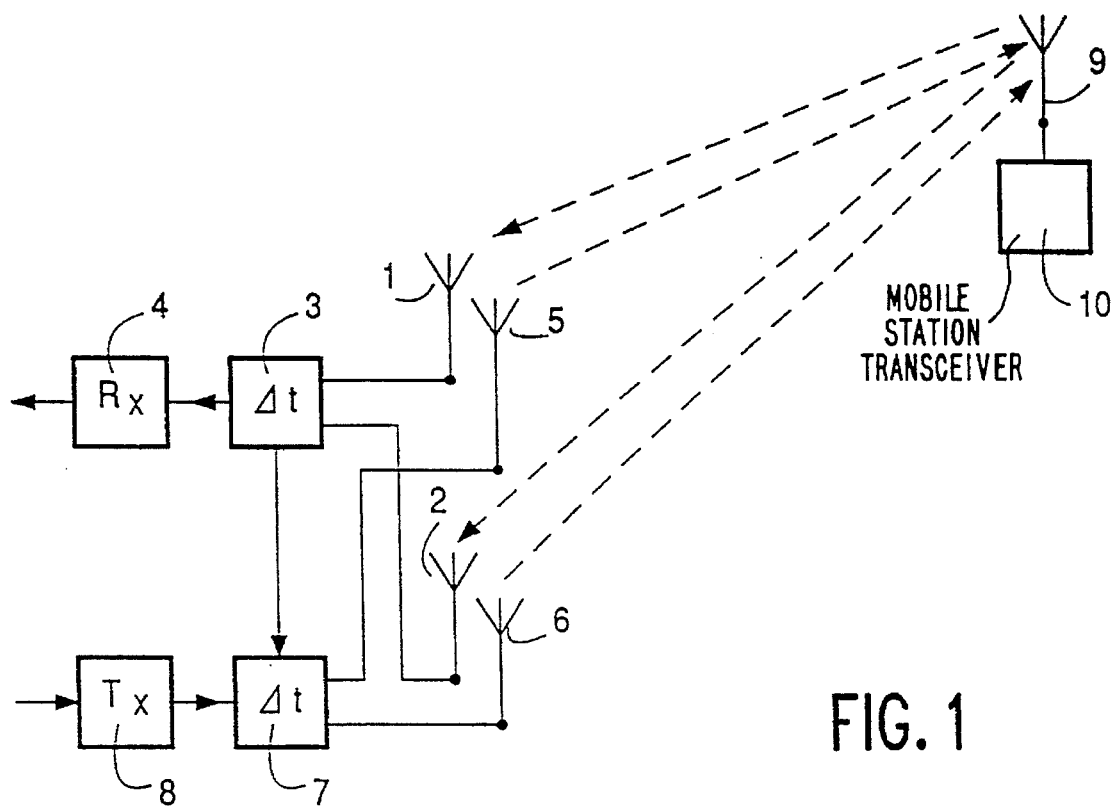
FIG. 1 shows a radio system with a transceiver device comprising transmitting and receiving antennas arranged in pairs.

The radio system shown in FIG. 1 comprises a base station and a mobile station. The base station comprises a transceiver device having two receiving antennas 1 and 2. To measure the time delays of two received signals, a detection device 3 is coupled to the two receiving antennas 1 and 2. A receiving device 4 is coupled to this detection device 3. This receiving device is used for demodulating the received signals and for processing them. Furthermore, two transmitting antennas 5 and 6 are provided. To these transmitting antennas 5 and 6 is coupled a device 7 which adjusts a time delay between the two transmit signals. The transmit signals are generated by a transmitting device 8 which is coupled to the device for adjusting the time delay of the transmit signal 7. The device 3 for detecting the time delay of the received signals is coupled to the device 7 for adjusting the time delay of the transmit signals. The time delay adjusted by the device 7 in the transmit branch is then equal to the time delay detected in the received signals by the device 3. The mobile station shown comprises an antenna 9 and a transceiver device 10.

If a signal is transmitted from the mobile station via the antenna 9, it will be received by the base station via the antennas 1 and 2. The time delay between the two antenna signals is then measured by the detection device 3. During a subsequent transmission the base station transmits a signal via the two antennas 5 and 6 via the delay element 7, which element is adjusted in response to the time delay measured by the detection device 3. At the mobile station these two transmitted signals are received and constructively superimposed upon each other. As a result, the field strength at the mobile station is increased in comparison to a simple transmission via only a single antenna, and so an improved receiving quality is obtained.

The transceiver device comprising a plurality of transmitting antennas and a plurality of receiving antennas can, according to the present invention, also be used in the mobile station, so that there is an increase of field strength at the base station. In the present description the connotations of base station and mobile station are interchangeable.

Figure 2:
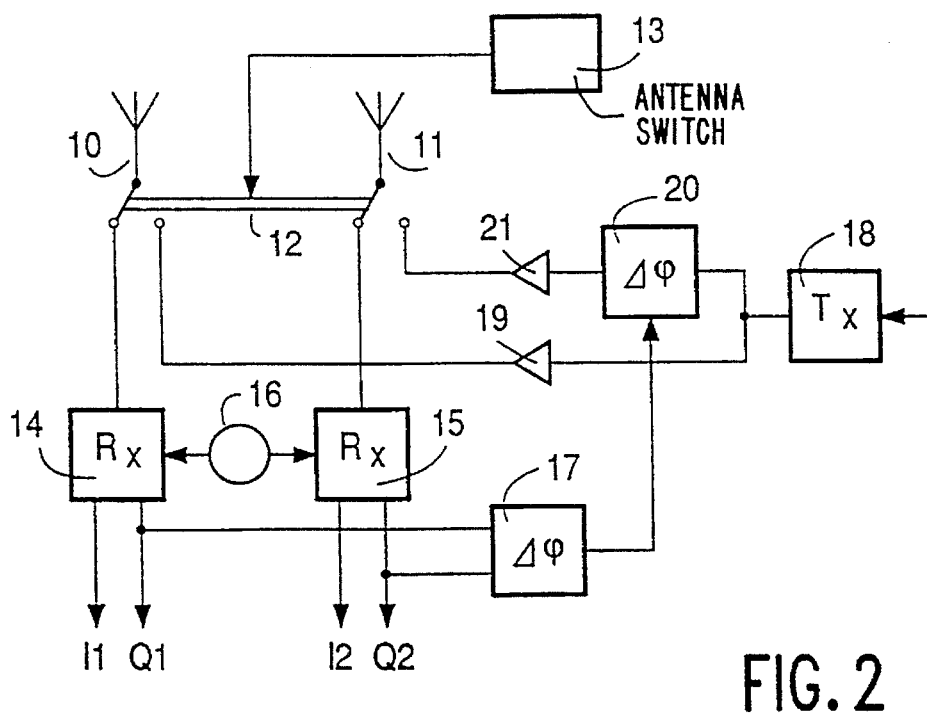
FIG. 2 shows a transceiver device comprising two antennas arranged for both transmitting and receiving.

FIG. 2 shows a further embodiment comprising a transceiver device having at least two antennas. The transceiver device comprises two antennas used for both transmitting and receiving. Such a transceiver device may be utilized to extreme advantage in half duplex radio systems in which transmission and reception alternately takes place over a single radio channel. There are two antennas 10 and 11 which are used both for receiving and transmitting signals. Coupled to these antennas is a change-over switch 12 which couples the two antennas 10 and 11 to the two receive branches of the transceiver device and also to the two transmit branches of the transceiver device. The change-over switch 12 is controlled via a controller 13 which decides whether transmission or reception is to take place. The two receive branches comprise receivers 14 and 15 which are used for demodulating the radio signals received from the antennas 10 and 11. The two receivers 14 and 15 are coupled to a synchronizer 16. This synchronizer 16 is used for synchronizing the mixing frequencies in the two receivers 14 and 15 by which the still modulated received signals are multiplied. The two receivers 14 and 15 are arranged as quadrature receivers. The quadrature components I1 and Q1 are available at two outputs of the first receiver 14, the quadrature components I2 and Q2 are available at two outputs of the second receiver 15. A phase detector 17 for detecting the phase difference between the signals received by the antennas 10 and 11 is coupled to the two outputs of the receivers 14 and 15 at whose outputs the quadrature components Q1 and Q2 are available. From these two quadrature components, thus from the low-frequency demodulated received signals, the phase detector 17 determines the phase difference between the received signals. It would also be possible to determine the phase difference between the received signals on the basis of the quadrature components I1 and I2. Identical low-pass receiving filters in the quadrature receivers are advantageous, because otherwise the detection of the phase differences would be corrupted.

The transmit portion of the transceiver device comprises a transmitter 18. This transmitter supplies two transmit branches with transmit signals. The first transmit branch comprises a first power amplifier 19 inserted between transmitter 18 and a first terminal of the change-over switch 12. The second transmit branch comprises a phase shifter 20 at the output of the transmitter 18, which shifter shifts the transmit signals generated by the transmitter 18 by an adjustable phase difference. The adjustable phase difference of the phase shifter 20 corresponds to the phase difference determined on the basis of the two quadrature components Q1 and Q2 by detection device 17 of the signals received from the antennas 10 and 11. A further power amplifier 21 is inserted between the phase shifter 20 and a second terminal of the change-over switch 12.

Figure 3:
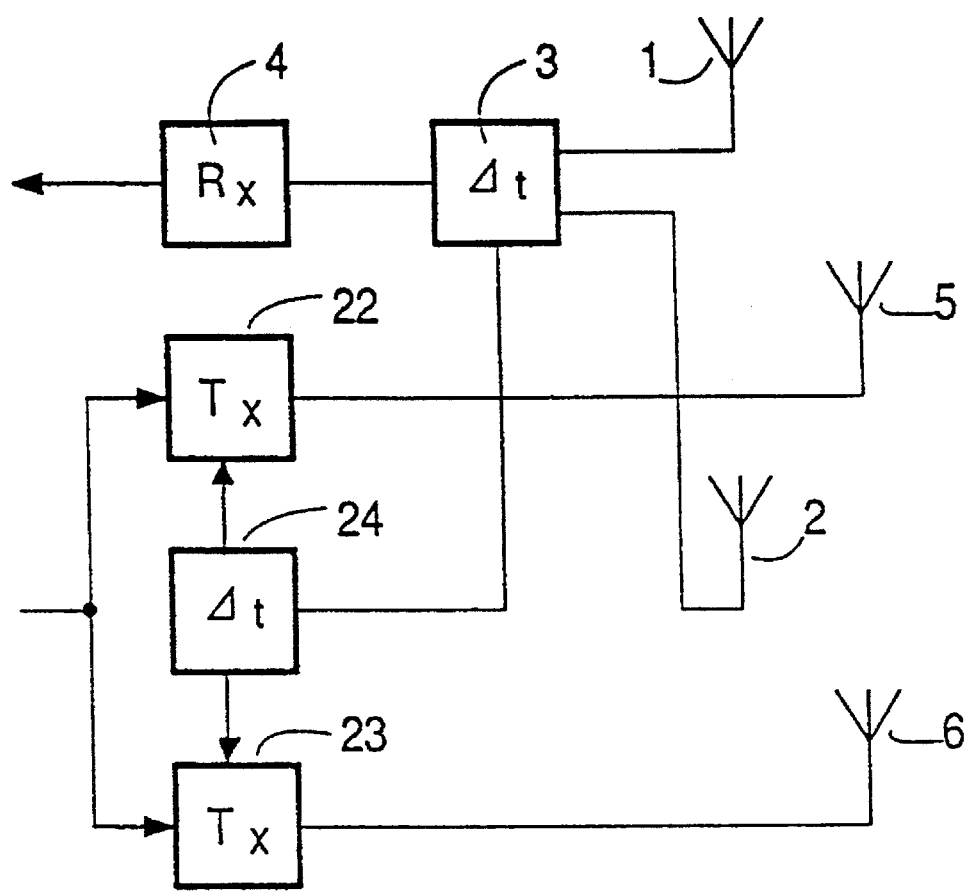
FIG. 3 shows an embodiment of the transceiver device of the radio system shown in FIG. 1.

The arrangement shown in FIG. 3 of the transceiver device of the radio system shown in FIG. 1 comprises two transmitting devices 22, 23 for generating transmit signals and are controlled by a controller 24. The controller 24 is connected to the detection device 3. The detection device provides that the transmitting devices 22, 23 transmit with the time delay detected between the received signals by the detection device, so that said advantageous effects of a time delay between the transmit signals are achieved.

A use of a radio system comprising one of said transceiver devices is advantageous in mobile radio systems according to the DECT standard (Digital European Cordless Telephone). In these systems the distance between the two radio subscribers is generally only several hundred meters. Therefore, time delays may be taken into account that are small relative to the period of one bit.

We claim:

1. A transceiver for use in a radio communication system wherein said transceiver is one of a plurality of transceivers and communicates with at least an other of said transceivers, said one transceiver being remote from said other transceiver; said one transceiver comprising:

a plurality of receiving antennas for producing separate received antenna signals from radio signals received from said other transceiver;

detecting means coupled to the receiving antennas for detecting a time delay between the received antenna signals;

transmitting means including a plurality of transmitting antennas for transmitting radio signals which are received at said other transceiver; and means coupled to said transmitting means and further being responsive to an output of said time delay detecting means for producing a time delay between the transmitted radio signals which substantially matches the detected time delay between the received antenna signals.

2. The one transceiver as claimed in claim 1, wherein the transmitting and receiving antennas are arranged in pairs, each pair consisting of a transmitting antenna and a receiving antenna.

3. The one transceiver claimed in claim 2, wherein each pair of receiving and transmitting antennas is physically a single antenna which is switched so as to alternately serve as a receiving antenna and as a transmitting antenna.

4. The one transceiver claimed in claim 1, further comprising two quadrature related receive branches for demodulating the received antenna signals, and means for synchronizing the two receive branches.

5. The one transceiver claimed in claim 1, wherein said detecting means detects the time delay between the received antenna signals as a phase difference, and said means for producing a time delay between the transmitted radio signals produces a phase difference there-between.

6. The one transceiver claimed in claim 1, wherein said radio communication system is a mobile radio system which includes a base station, and said one transceiver is for use in said base station.

7. A transceiver for use in a ratio communication system wherein said transceiver is one of a plurality of transceivers and communicates with at least an other of said transceivers, said one transceiver being remote from said other transceiver; said one transceiver comprising:

a plurality of receiving antennas for producing separate received antenna signals from radio signals received from said other transceiver;

detecting means coupled to the receiving antennas for detecting a time delay between the received antenna signals, wherein the detected time delay between the received antenna signals is derived from quadrature components thereof;

transmitting means including a plurality of transmitting antennas for transmitting radio signals which are received at said other transceiver; and means coupled to said transmitting means for producing a time delay between the transmitted radio signals which substantially matches the detected time delay between the received antenna signals.

8. The one transceiver claimed in claim 7, wherein the transmitting and receiving antennas are arranged in pairs, each pair consisting of a transmitting antenna and a receiving antenna.

9. The one transceiver claimed in claim 8, wherein each pair of receiving and transmitting antennas is physically a single antenna which is switched so as to alternately serve as a receiving antenna and as a transmitting antenna.

10. The one transceiver claimed in claim 7, further comprising two quadrature related receive branches for demodulating the received antenna signals, and means for synchronizing the two receive branches.

11. The one transceiver claimed in claim 7, wherein said detecting means detects the time delay between the received antenna signals as a phase difference, and said means for producing a time delay between the transmitted radio signals produces a phase difference there-between.

12. The one transceiver claimed in claim 7, wherein said radio communication system is a mobile radio system which includes a base station, and said one transceiver is for use in said base station.

13. A base station transceiver for a mobile radio system which includes a base station and a mobile transceiver remote from the base station, said base station transceiver comprising:

a plurality of receiving antennas for producing separate antenna signals from radio signals received from the mobile transceiver;

detecting means coupled to the receiving antennas for detecting a time delay between the received antenna signals, wherein the detected time delay between the received antenna signals is derived from quadrature components thereof;

transmitting means including a plurality of transmitting antennas for transmitting radio signals which are received at the mobile transceiver; and means coupled to said transmitting means for producing a time delay between the transmitted radio signals which substantially matches the detected time delay between the received antenna signals.

14. A mobile transceiver for use in a mobile radio system which includes a base station transceiver, said mobile transceiver comprising:

a plurality of receiving antennas for producing separate antenna signals from radio signals received from the base station transceiver;

detecting means coupled to the receiving antennas for detecting a time delay between the received antenna signals, wherein the detected time delay between the received antenna signals is derived from quadrature components thereof;

transmitting means including a plurality of transmitting antennas for transmitting radio signals to the base station transceiver; and means coupled to said transmitting means for producing a time delay between the transmitted radio signals which substantially matches the detected time delay between the received antenna signals.

* * * * *